United States Patent
Li

(10) Patent No.: US 9,819,780 B2
(45) Date of Patent: Nov. 14, 2017

(54) METHOD AND APPARATUS FOR BLUETOOTH DEVICE MANAGEMENT

(71) Applicants: Qingdao Yeelink Information Technology Co., Ltd., Qingdao, Shandong (CN); Xiaomi Inc., Beijing (CN)

(72) Inventor: Xin Li, Shandong (CN)

(73) Assignees: Qingdao Yeelink Information Technology Co., Ltd., Qindao, Shandong (CN); Xiaomi Inc., Beijing (CN)

(*) Notice: Subject to any disclaimer, the term of this patent is extended or adjusted under 35 U.S.C. 154(b) by 0 days.

(21) Appl. No.: 15/298,553

(22) Filed: Oct. 20, 2016

(65) Prior Publication Data

US 2017/0155750 A1    Jun. 1, 2017

(30) Foreign Application Priority Data

Nov. 26, 2015  (CN) .......................... 2015 1 0844911

(51) Int. Cl.
 *H04W 4/00* (2009.01)
 *H04M 1/725* (2006.01)
 *H04W 4/06* (2009.01)
 *H04W 76/02* (2009.01)

(52) U.S. Cl.
 CPC ..... *H04M 1/7253* (2013.01); *H04M 1/72533* (2013.01); *H04W 4/008* (2013.01); *H04W 4/06* (2013.01); *H04W 76/021* (2013.01)

(58) Field of Classification Search
 CPC ..................................................... H04W 4/008
 See application file for complete search history.

(56) References Cited

U.S. PATENT DOCUMENTS

| | | | | |
|---|---|---|---|---|
| 2010/0176915 A1* | 7/2010 | Hayes | ..................... | G08C 17/02 340/5.2 |
| 2010/0304674 A1* | 12/2010 | Kim | ..................... | H04W 76/02 455/41.2 |
| 2013/0217332 A1* | 8/2013 | Altman | ................... | H04H 60/90 455/41.2 |
| 2014/0342670 A1* | 11/2014 | Kang | ..................... | H04W 4/008 455/41.2 |
| 2015/0168931 A1* | 6/2015 | Jin | ............................ | H04L 12/12 700/90 |
| 2015/0237462 A1* | 8/2015 | Han | ....................... | H04W 4/008 455/404.1 |
| 2015/0341440 A1* | 11/2015 | Nelson | ................. | H04W 76/007 455/41.2 |

* cited by examiner

*Primary Examiner* — David Bilodeau
(74) *Attorney, Agent, or Firm* — Young Basile Hanlon & MacFarlane, P.C.

(57) ABSTRACT

Methods and apparatuses for Bluetooth device management in a technical field of wireless communications are disclosed herein. The method for Bluetooth device management comprises establishing a Bluetooth connection between a first terminal device and a Bluetooth device; receiving, by the first terminal device, control data sent by at least a second terminal device connected to the first terminal device, wherein the control data is used to control the Bluetooth device; and sending, by the first terminal device, a Bluetooth control message associated with the control data to the Bluetooth device.

17 Claims, 12 Drawing Sheets

METHOD AND APPARATUS FOR BLUETOOTH DEVICE MANAGEMENT

CROSS-REFERENCE TO RELATED APPLICATION(S)

This application claims priority to Chinese patent application No. 201510844911.7, filed Nov. 26, 2015 and incorporated herein by reference in its entirety.

TECHNICAL FIELD

This disclosure relates to wireless communications, and specifically, to methods and apparatuses for Bluetooth device management.

BACKGROUND

As a wireless communications protocol, Bluetooth® technologies are becoming more and more widely used in devices of "smart homes," such as table lamps, doorbells, power strips and so on. For example, a table lamp that uses Bluetooth technologies for communication is often referred to as a Bluetooth table lamp.

In related technologies, after a Bluetooth device connects to a terminal device (e.g., a cellphone) with Bluetooth function, a user can control the Bluetooth device via the terminal device. For example, after a cellphone of the user connecting to a Bluetooth table lamp, the user can use the cellphone to switch the Bluetooth table lamp on and off without touching a switch of the Bluetooth table lamp. Since Bluetooth technologies use a master-slave connection protocol, most Bluetooth devices as slave devices are allowed to connect to only one master device. In those cases, a Bluetooth device can be controlled by only one terminal device.

SUMMARY

According to one aspect of the present disclosure, there is provided a method for Bluetooth device management is disclosed herein, comprising: establishing a Bluetooth connection between a first terminal device and a Bluetooth device; receiving, by the first terminal device, control data sent by at least a second terminal device connected to the first terminal device, wherein the control data is used to control the Bluetooth device; and sending, by the first terminal device, a Bluetooth control message associated with the control data to the Bluetooth device.

According to another aspect of the present disclosure, there is provided a method for Bluetooth device management is disclosed herein, comprising: determining, by a second terminal device, a first terminal device from terminal devices connected to the second terminal device, wherein the first terminal device has established a Bluetooth connection to a Bluetooth device; and sending, by the second terminal device, control data to the first terminal device, wherein the control data is used to control the Bluetooth device and the first terminal device sends a Bluetooth control message associated with the control data to the Bluetooth device.

According to another aspect of the present disclosure, there is provided an apparatus for Bluetooth device management is disclosed herein, comprising: a processor and a memory coupled to the processor. The memory is configured to store a set of instructions which when executed by the processor become operational with the processor to: establish a Bluetooth connection to a Bluetooth device; receive control data sent by at least a second terminal device connected to the apparatus, wherein the control data is used to control the Bluetooth device; and send a Bluetooth control message associated with the control data to the Bluetooth device.

According to another aspect of the present disclosure, there is provided an apparatus for Bluetooth device management is disclosed herein, comprising: a processor and a memory coupled to the processor. The memory configured to store a set of instructions which when executed by the processor become operational with the processor to: determine a first terminal device from terminal devices connected to the apparatus, wherein the first terminal device has established a Bluetooth connection to a Bluetooth device; and send control data to the first terminal device, wherein the control data is used to control the Bluetooth device and the first terminal device sends a Bluetooth control message associated with the control data to the Bluetooth device.

According to another aspect of the present disclosure, there is provided a non-transitory computer-readable medium storing a set of instructions which when executed by a computer system using a processor become operational with the processor for Bluetooth device management is disclosed herein, the non-transitory computer-readable medium comprising instructions to: establish a Bluetooth connection to a Bluetooth device; receive control data sent by at least one connected second terminal device, wherein the control data is used to control the Bluetooth device; and send a Bluetooth control message associated with the control data to the Bluetooth device.

According to another aspect of the present disclosure, there is provided a non-transitory computer-readable medium storing a set of instructions which when executed by a computer system using a processor become operational with the processor for Bluetooth device management is disclosed herein, the non-transitory computer-readable medium comprising instructions to: determine a first terminal device from connected terminal devices, wherein the first terminal device has established a Bluetooth connection to a Bluetooth device; and send control data to the first terminal device, wherein the control data is used to control the Bluetooth device and the first terminal device sends a Bluetooth control message associated with the control data to the Bluetooth device.

These and other aspects of the present disclosure are disclosed in the following detailed description of the implementations, the claims and the accompanying figures.

BRIEF DESCRIPTION OF THE DRAWINGS

Implementations of this disclosure are best understood from the following detailed description in conjunction with the accompanying drawings, which form part of the specification. It is emphasized that, according to common practice, the various features of the drawings are not to-scale. On the contrary, the dimensions of the various features are arbitrarily expanded or reduced for clarity.

DETAILED DESCRIPTION

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

Figure 1:
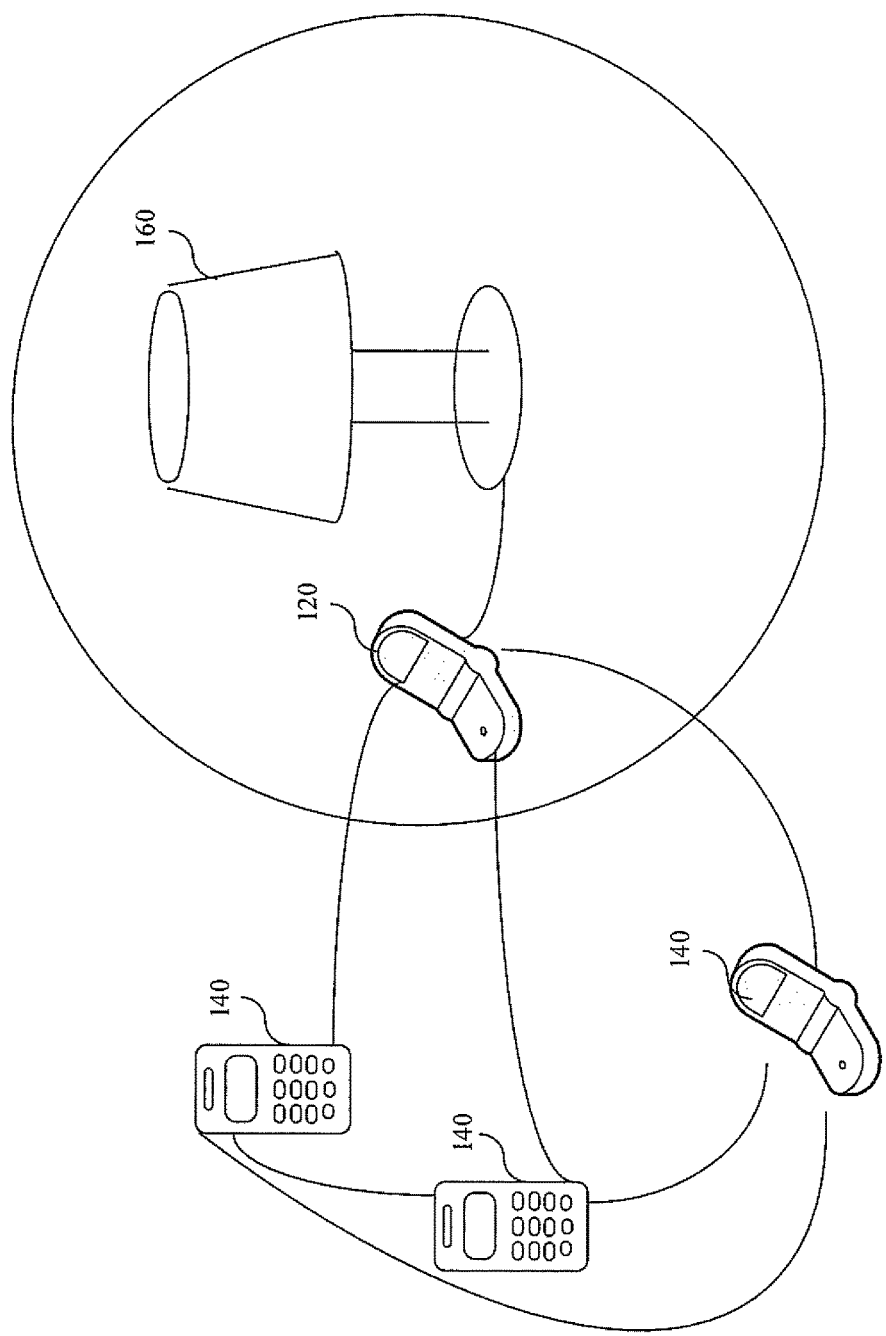
FIG. 1 is a diagram of an implementation environment of an example method for Bluetooth device management according to some implementations of this disclosure.

FIG. 1 illustrates an implementation environment of an example method for Bluetooth device management according to implementations of this disclosure. As shown in FIG. 1, the implementation environment can include a first terminal device 120, at least a second terminal device 140, and a Bluetooth device 160.

The first terminal device 120 can be any device with Bluetooth connection capability, such as, for example, smartphones, tablet computers, or personal computers (PCs).

The first terminal device 120 can send at least one broadcast message in a local area network (LAN) for establishing connections to other terminal devices. The LAN can be a wireless LAN such as ones that use IEEE 802.11 standards (e.g., Wi-Fi LAN), an Ethernet LAN conforming to Registered Jack 45 (RJ45) wire interface standard, or any other local area network.

The second terminal device 140 can have the same or similar capability or function as the first terminal device 120.

Optionally, in some implementations, the number of the second terminal device 140 can be at least one.

The Bluetooth device 160 can be a Bluetooth table lamp, a Bluetooth speaker/soundbar, a Bluetooth gateway, or any device that can be controlled by one or more other terminal devices via Bluetooth connections. For example, the Bluetooth device 160 can include a Bluetooth transceiver.

The first terminal device 120 can connect to the Bluetooth device 160 via a Bluetooth connection.

The first terminal device 120 can be within the same LAN as the second terminal device 160, in which at least a second terminal device 160 can connect to the first terminal device 120 via the LAN.

Figure 2:
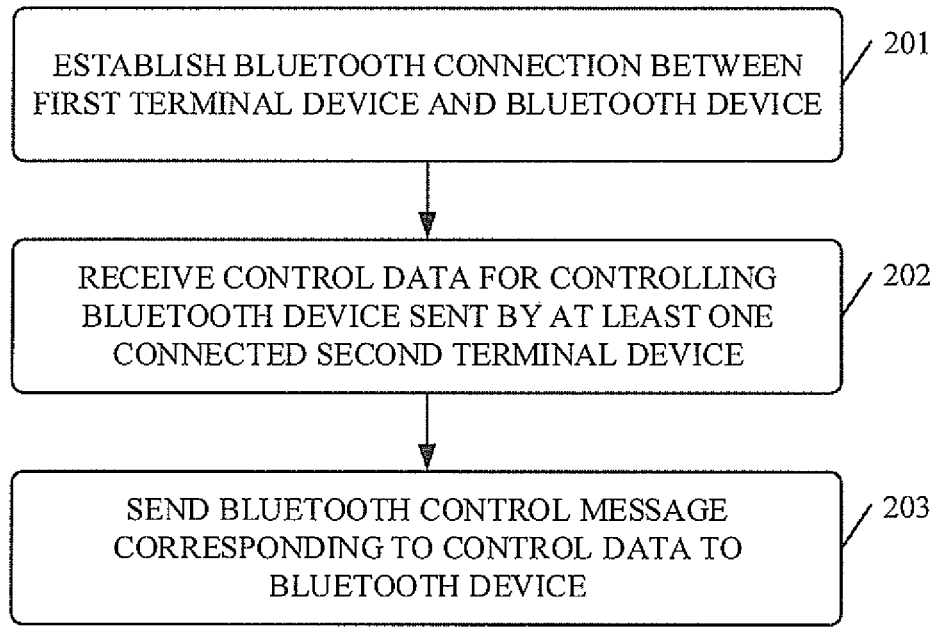
FIG. 2 is a flowchart of an example method for Bluetooth device management according to an implementation of this disclosure.

FIG. 2 illustrates a flowchart of an example method for Bluetooth device management according to implementations of this disclosure. As shown in FIG. 2, this method for Bluetooth device management can be used in the first terminal device 120 of the implementation environment shown in FIG. 1. This method can include the following operations.

At operation 201, a Bluetooth connection can be established between a first terminal device and a Bluetooth device.

At operation 202, control data sent by at least a second terminal device connected to the first terminal device can be received by the first terminal device, in which the control data can be used to control the Bluetooth device. The term "receive" used herein can refer to the act of receiving, inputting, acquiring, retrieving, obtaining, reading, accessing, identifying or any other means of getting data.

In some implementations, the connection between the first terminal device and the at least a second terminal device can be a LAN connection, such as a wireless LAN connection, e.g., a Wi-Fi connection.

At operation 203, a Bluetooth control message associated with the control data can be sent by the first terminal device to the Bluetooth device.

Optionally, in some implementations, the first terminal device can also send the Bluetooth control message to the Bluetooth device by itself, i.e., the first terminal device can also control the Bluetooth device.

As discussed above, in the method for Bluetooth device management set forth according to implementations of this disclosure, by establishing the Bluetooth connection between the first terminal device and the Bluetooth device, the control data sent by the at least a second terminal device connected to the first terminal device can be received, and the Bluetooth control message associated with the control data can be sent to the Bluetooth device. The method can solved the problem that one Bluetooth device can be controlled by only one terminal device, and achieve a function of one-to-many connection between Bluetooth devices and terminal devices, enabling a Bluetooth device to be controlled by multiple terminal devices including the first and second terminal device, which can produce an effect of enlarging a controlling range for Bluetooth devices.

Figure 3:
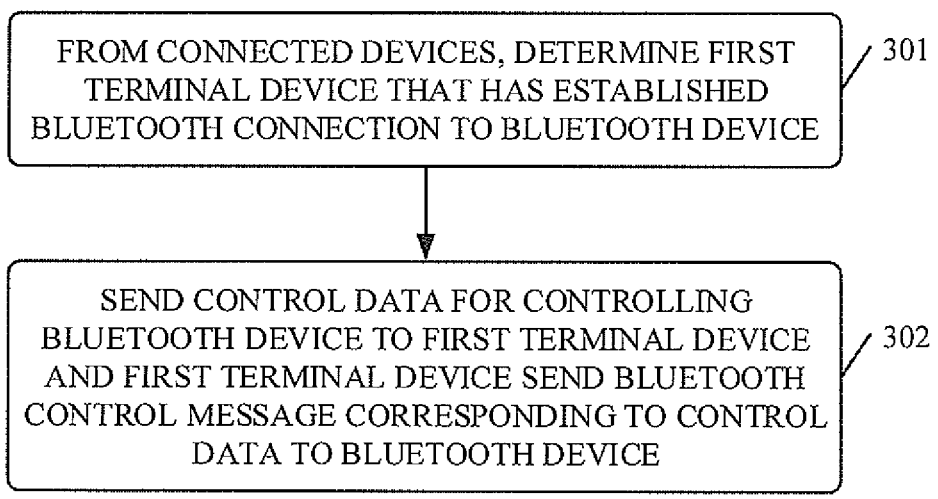
FIG. 3 is a flowchart of another example method for Bluetooth device management according to another implementation of this disclosure.

FIG. 3 illustrates a flowchart of another example method for Bluetooth device management according to implementations of this disclosure. As shown in FIG. 3, this method for Bluetooth device management can be used in the second terminal device 140 of the implementation environment shown in FIG. 1. This method can include the following operations.

At operation 301, a first terminal device can be determined by a second terminal device from terminal devices connected to the second terminal device, in which the first terminal device can have established a Bluetooth connection to a Bluetooth device.

At operation 302, control data can be sent by the second terminal device to the first terminal device, in which the control data can be used to control the Bluetooth device and the first terminal device can send a Bluetooth control message associated with the control data to the Bluetooth device.

As discussed above, in the method for Bluetooth device management set forth according to implementations of this disclosure, by determining the first terminal device by the second terminal device from the devices connected to the second terminal device, the control data can be sent to the first terminal device. The method can solved the problem that one Bluetooth device can be controlled by only one terminal device, and achieve a function of one-to-many connection between Bluetooth devices and terminal devices, enabling a Bluetooth device to be controlled by multiple terminal devices including the first and second terminal device, which can produce an effect of enlarging a controlling range for Bluetooth devices.

Figure 4A:
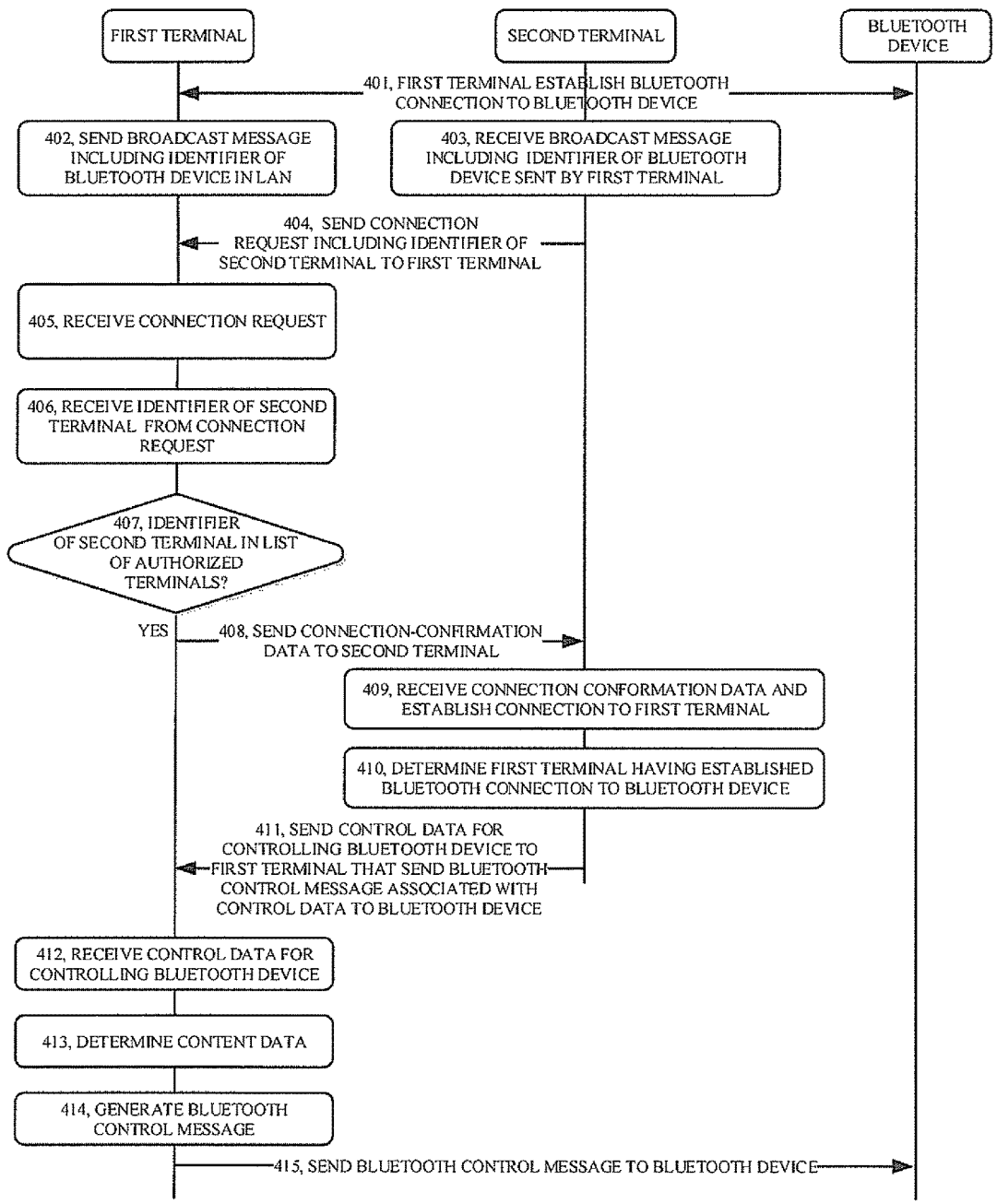
FIG. 4A is a flowchart of an example method for Bluetooth device management according to an implementation of this disclosure.

FIG. 4A illustrates a flowchart of an example method for Bluetooth device management according to implementations of this disclosure. As shown in FIG. 4A, this method for Bluetooth device management can be used in the first terminal device 120 and the second terminal device 140 of the implementation environment shown in FIG. 1. This method can include the following operations.

At operation 401, a first terminal can establish a Bluetooth connection to a Bluetooth device.

In some implementations, for example, when the first terminal device is within a connectable range of the Bluetooth device, the first terminal device can establish a Bluetooth connection to the Bluetooth device.

At operation 402, at least one broadcast message can be sent by the first terminal device in a LAN, in which the at least one broadcast message can include an identifier of the Bluetooth device.

Optionally, in some implementations, the LAN can be a wired or wireless LAN. For example, the LAN can be an Ethernet LAN conforming RJ45 wire interface standard, and the wireless LAN can be a Wi-Fi LAN.

In some implementations, in the LAN, the first terminal device can send the at least one broadcast message that includes the identifier of the Bluetooth device.

Optionally, in some implementations, for example, the identifier of the Bluetooth device can include at least one of a name, a serial number, a Media Access Control (MAC) address, a portion of any of the above, or any other data that can be used to identify the Bluetooth device.

Optionally, in some implementations, the at least one broadcast message sent by the first terminal device can include an identifier of the first terminal device.

At operation 403, one or more of the at least one broadcast message sent by the first terminal device can be received by the second terminal device, in which the received broadcast message can include the identifier of the Bluetooth device.

In some implementations, the second terminal device can receive the one or more of the at least one broadcast message sent by the first terminal device and determine (e.g., analyze) related data in the received broadcast message. The determined related data can be shown in a user interactive interface to a user that is using the second terminal device.

Figure 4B:
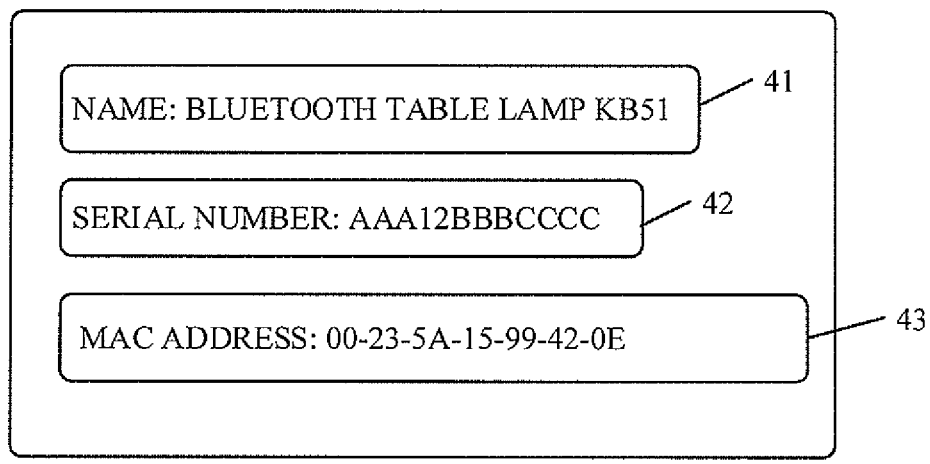
FIG. 4B is a diagram of an implementation of an example method for Bluetooth device management according to an implementation of this disclosure.

FIG. 4B is a diagram of an implementation of an example method for determining the related data from the received broadcast message by the second terminal device according to implementations of this disclosure. For example, in FIG. 4B, block 41 can represent that the name of the Bluetooth device is "Bluetooth table lamp KB51;" block 42 can represent that the serial number of the Bluetooth device is "AAA12BBBCCCC;" and block 43 can represent that the MAC address of the Bluetooth device is "00-23-5A-15-99-0E."

Back to FIG. 4A, at operation 404, in accordance with the received broadcast message, a connection request can be sent by the second terminal device to the first terminal device, in which the connection request can include an identifier of the second terminal device.

In some implementation, for example, the user can opt to connect to the first terminal device, and the second terminal device can send the connection request to the first terminal device via the LAN, in which the connection request can include the identifier of the second terminal device.

At operation 405, the first terminal device can receive a connection request sent by the second terminal device in accordance with the broadcast message.

For example, the first terminal device can receive the connection request sent by the second terminal device via the LAN.

In some implementations, the first terminal device can establish the connection to the second terminal device in accordance with the connection request, and accordingly, the second terminal device can establish the connection to the first terminal device in accordance with the connection request. The connecting process can include the following operations.

At operation 406, the first terminal device can receive the identifier of the second terminal device from the connection request.

For example, the first terminal device can acquire the identifier of the second terminal device from the connection request sent by the second terminal device.

At operation 407, the first terminal device can determine whether the identifier of the second terminal device is in a list of authorized terminal devices.

For example, the first terminal device can store identifiers of terminal devices that have been authorized, in a form of the list of authorized terminal devices.

Optionally, in some implementations, the authorized terminal devices can be devices that have established connections to the first terminal device.

Figure 4C:
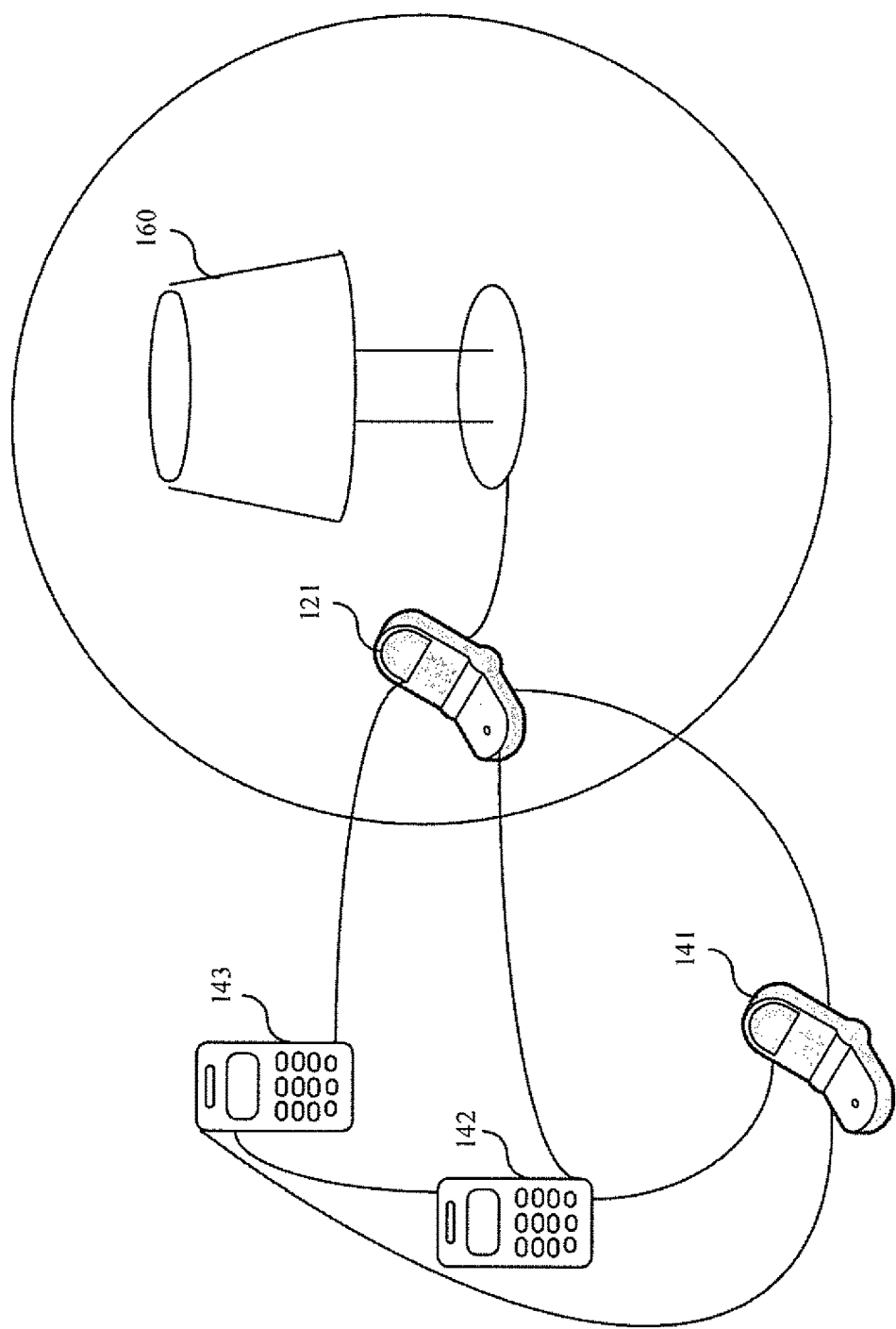
FIG. 4C is a diagram of another implementation of an example method for Bluetooth device management according to an implementation of this disclosure.

For example, as shown in FIG. 4C, a first terminal device 121 has established a first connection to a second terminal device 141, a second connection to a second terminal device 142, and a third connection to a second terminal device 143; accordingly, the second terminal devices 141, 142, and 143 have established interconnections between each other. The first terminal device 121 and the second terminal device 141, 142, and 143 are mutually authorized terminal devices, i.e.: identifiers of the second terminal device 141, 142, and 143 are in a first list of authorized terminal devices in the first terminal device 121; identifiers of the first terminal device 121 and the second terminal device 142 and 143 are in a second list of authorized terminal devices in the second terminal device 141; identifiers of the first terminal device 121 and the second terminal device 141 and 143 are in a third list of authorized terminal devices in the second terminal device 142; and identifiers of the first terminal device 121 and the second terminal device 141 and 142 are in a fourth list of authorized terminal devices in the second terminal device 143.

In some implementations, the first terminal device can determine whether the received identifier of the second terminal device is in the list of the authorized terminal devices. If the identifier of the second terminal device is in the list of the authorized terminal devices, operation 408 can be performed.

Back to FIG. 4A, at operation 408, if the identifier of the second terminal device is determined as in the list of the authorized terminal devices, the first terminal device can send connection confirmation data to the second terminal device, based on which the second terminal device can establish the connection to the first terminal device.

For example, if the first terminal device determined that the identifier of the second terminal device is in the list of the authorized terminal devices, the first terminal device can send the connection confirmation data to the second terminal device, and the second terminal device can establish the connection to the first terminal device based on the connection confirmation data sent by the first terminal device.

At operation 409, the second terminal device can receive the connection confirmation data and establish the connection to the first terminal device based on the connection confirmation data.

At operation 410, from connected devices, the second terminal device can determine the first terminal device, in which the first terminal device can have established the Bluetooth connection to the Bluetooth device.

For example, when needing to control the Bluetooth device, the second terminal device can determine the first terminal devices from the connected devices. There connected devices can be multiple devices connected to the second terminal device, in which the first terminal device is the one that has established the Bluetooth connection to the Bluetooth device.

At operation 411, the second terminal device can send control data to the first terminal device, in which the control data can be used to control the Bluetooth device and the first terminal device can send a Bluetooth control message associated with the control data to the Bluetooth device.

In some implementations, the first terminal device can be used to send the Bluetooth control message associated with the control data to the Bluetooth device.

In some implementations, the second terminal device can send control data to the first terminal device, in which the control data can be used to control the Bluetooth device and, based on the received control data, the first terminal device can send the Bluetooth control message to the Bluetooth device.

To clarify, the implementations of this disclosure do not limit the control data with respect to types of control and/or formats of data.

At operation 412, the first terminal device can receive the control data sent by at least a second terminal device connected to the first terminal device, in which the control data can be used to control the Bluetooth device.

In some implementations, there can be multiple second terminal devices having established connections to the first terminal device, in which each of the second terminal devices connected to the first terminal device can send control data to the first terminal device and control the Bluetooth device via sending the control data to the first terminal device.

At operation 413, the first terminal device can determine content data based on the control data.

In some implementations, the control data can be data that conforms to a LAN transmission protocol. For example, according to a corresponding LAN transmission protocol, the first terminal device can determine (e.g., analyze) the content data based on the control data.

At operation 414, based on the content data, the first terminal can generate the Bluetooth control message.

In some implementations, for example, the first terminal device can generate the Bluetooth control message in accordance with the content data that can be determined by analyzing/parsing the control data. In some implementations, the Bluetooth control message can be consistent with (e.g., same as or equivalent to) the content data determined from the control data sent by the second terminal device but use a different transmission protocol.

At operation 415, the first terminal device can send the Bluetooth control message to the Bluetooth device.

For example, the first terminal device can send the Bluetooth control message to the Bluetooth device.

Optionally, in some implementations, the first terminal device can generate the Bluetooth control message based on analyzing/parsing the control data sent by the second terminal device, or based on a control purpose of the first terminal device.

In accordance, in some implementations, the Bluetooth device can receive and/or execute the Bluetooth control message.

As discussed above, in the method for Bluetooth device management set forth according to implementations of this disclosure, by establishing the Bluetooth connection between the first terminal device and the Bluetooth device, the second terminal device can determine the first terminal device from the connected devices and send the control data for controlling the Bluetooth device to the first terminal device; the first terminal device can receive the control data from at least one connected second terminal device and send the Bluetooth control message associated with the control message to the Bluetooth device. The method can solved the problem that one Bluetooth device can be controlled by only one terminal device, and achieve a function of one-to-many connection between Bluetooth devices and terminal devices, enabling a Bluetooth device to be controlled by multiple terminal devices including the first and second terminal device, which can produce an effect of enlarging a controlling range for Bluetooth devices.

Further, in some implementations of this disclosure, by determining whether the identifier of the second terminal device is in the list of authorized terminal devices, establishing a connection to the second terminal device can be rendered optional to avoid unauthorized access from malicious terminals, which can improve security of the use of Bluetooth devices.

Figure 5A:
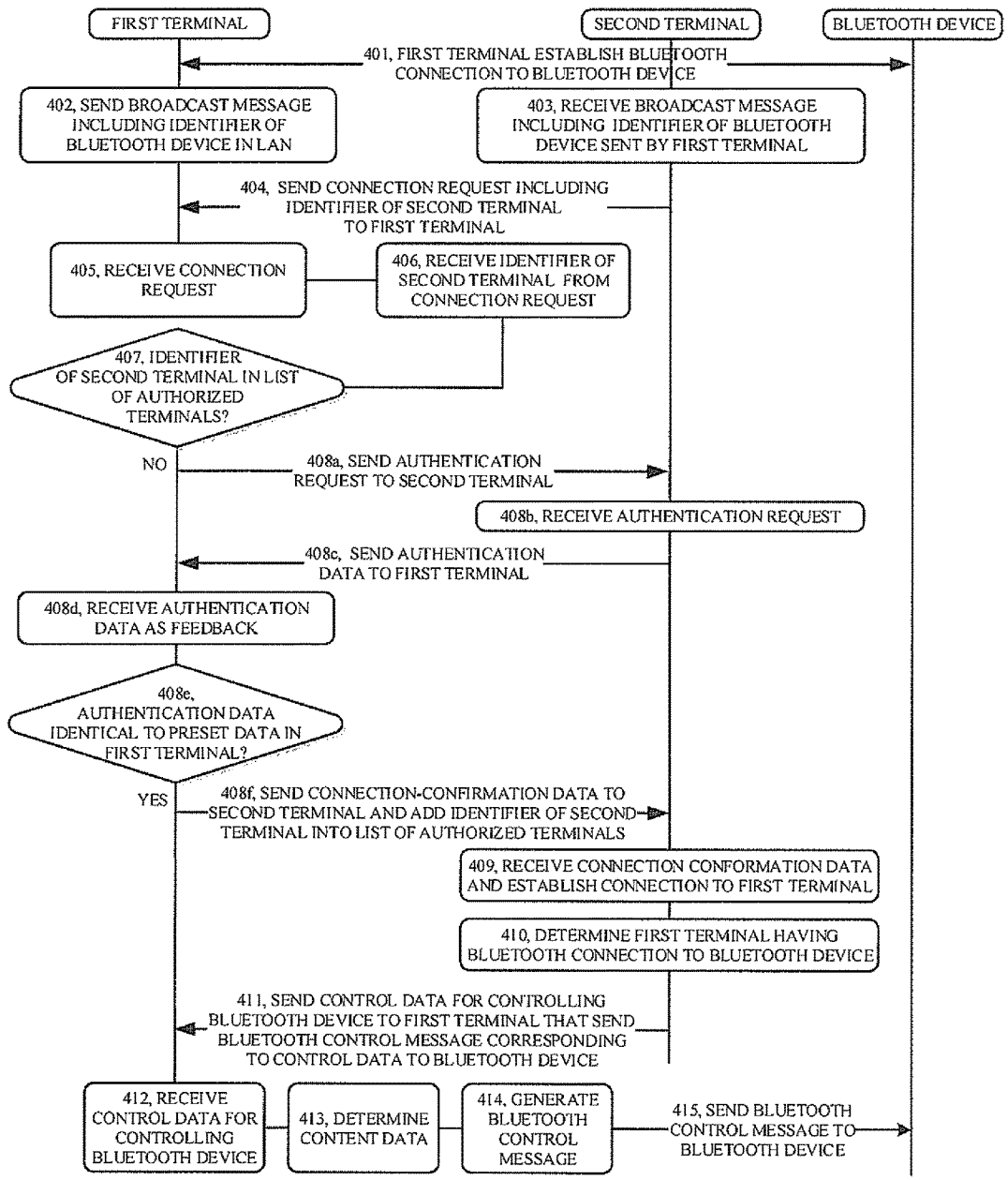
FIG. 5A is a flowchart of an example method for Bluetooth device management according to an implementation of this disclosure.

In optional implementations of implementations shown in FIG. 4A, if the identifier of the second terminal device is not in the list of authorized terminal devices, operation 408 can be alternatively implemented as operation 408a, and, prior to operation 409, there can be operations 408b, 408c, 408d, 408e, and 408f, as shown in FIG. 5A.

At operation 408a, if the identifier of the second terminal device is determined as not in the list of authorized terminal devices, the first terminal device can send an authentication request to the second terminal device.

For example, if the identifier of the second terminal device does not belong to the list of authorized terminal devices in the first terminal device, the first terminal device can send the authentication request to the second terminal device.

In some implementations, the authentication request can be used by the first terminal device to determine whether the second terminal device is secure.

Optionally, in some implementations, the authentication request can be a request sent by the first terminal device to the second terminal device which can require inputting an authentication code.

Alternatively, in some implementations, the authentication request can be a request sent by the first terminal device to the second terminal device for acquiring an identifier of a network that the second terminal device is within.

At operation 408b, the second terminal can receive the authentication request sent by the first terminal device.

Figure 5B:
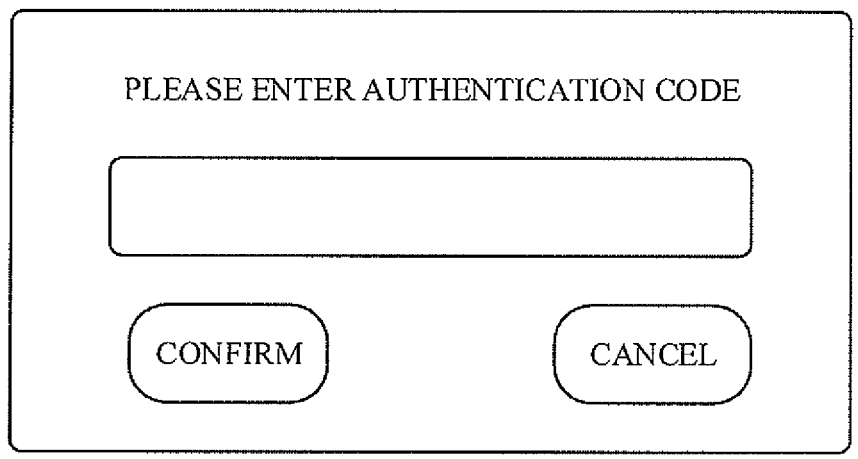
FIG. 5B is a diagram of an implementation of an example method for Bluetooth device management according to an implementation of this disclosure.

Optionally, in some implementations, if the authentication request is the request sent by the first terminal device to the second terminal device which can require inputting an authentication code, the second terminal device can display an interface for authentication code inputting at a user interactive interface to a user of the second terminal device, as shown in FIG. 5B.

Optionally, in some implementations, if the authentication request is the request sent by the first terminal device to the second terminal device for acquiring the identifier of the network that the second terminal device is within, in response to receiving the authentication request, the second terminal device can automatically process the authentication request in background, without displaying anything in the user interactive interface.

At operation 408c, the second terminal device can send authentication data to the first terminal device in accordance with the authentication request.

Optionally, in some implementations, the user of the second terminal device can input an authentication code in the interface for authentication code inputting as shown in FIG. 5B, and then the second terminal device can send the authentication code inputted by the user, which is one type of the authentication data, to the first terminal device. For example, the authentication code can be a string preset by a user of the first terminal device, which, in some implementations, can be verbally/orally informed by the user of the first terminal device to the user of the second terminal device.

Optionally, in some implementations, the second terminal device can send the identifier of the network that the second terminal device is within to the first terminal device as the authentication data.

At operation 408d, the first terminal device can receive the authentication data sent by the second terminal device as feedback.

At operation 408e, the first terminal device can determine whether the authentication data is consistent with preset data in (e.g., stored or pre-stored in) the first terminal device.

Optionally, in some implementations, the preset data in the first terminal device can be a string of characters preset by the user of the first terminal device, or, alternatively, a testable condition with respect to a string.

In some implementations, the first terminal device can determine whether the received authentication data is consistent with the preset data by, for example, determining whether the authentication code sent by the second terminal device is consistent with the preset string, or, alternatively, determining whether the identifier of the network that the second terminal device is within is consistent with the identifier of a network that the first terminal device is within.

At operation 408f, if the authentication data determined as consistent with the preset data, the first terminal device can send the connection confirmation data to the second terminal device and add the identifier of the second terminal device into the list of authorized terminal devices, in which the second terminal device can establish the connection to the first terminal device based on the connection confirmation data.

In some implementations, if the authentication data is determined as consistent with the preset data, the first terminal device can send the connection confirmation data to the second terminal device and add the identifier of the second terminal device into the list of authorized terminal devices in the first terminal device. Accordingly, in some implementation, other second terminal devices that have connected to the first terminal device can add the identifier of the newly connected second terminal device into their own lists of authorized terminal devices.

In some implementations, if the authentication data is determined as not consistent with the preset data, the first terminal device can terminate information interactions with the second terminal device.

Further, in some implementations of this disclosure, by determining whether the identifier of the second terminal device is in the list of authorized terminal devices, establishing a connection to the second terminal device can be rendered optional to avoid unauthorized access from malicious terminals, which can improve security of the use of Bluetooth devices.

Figure 5C:
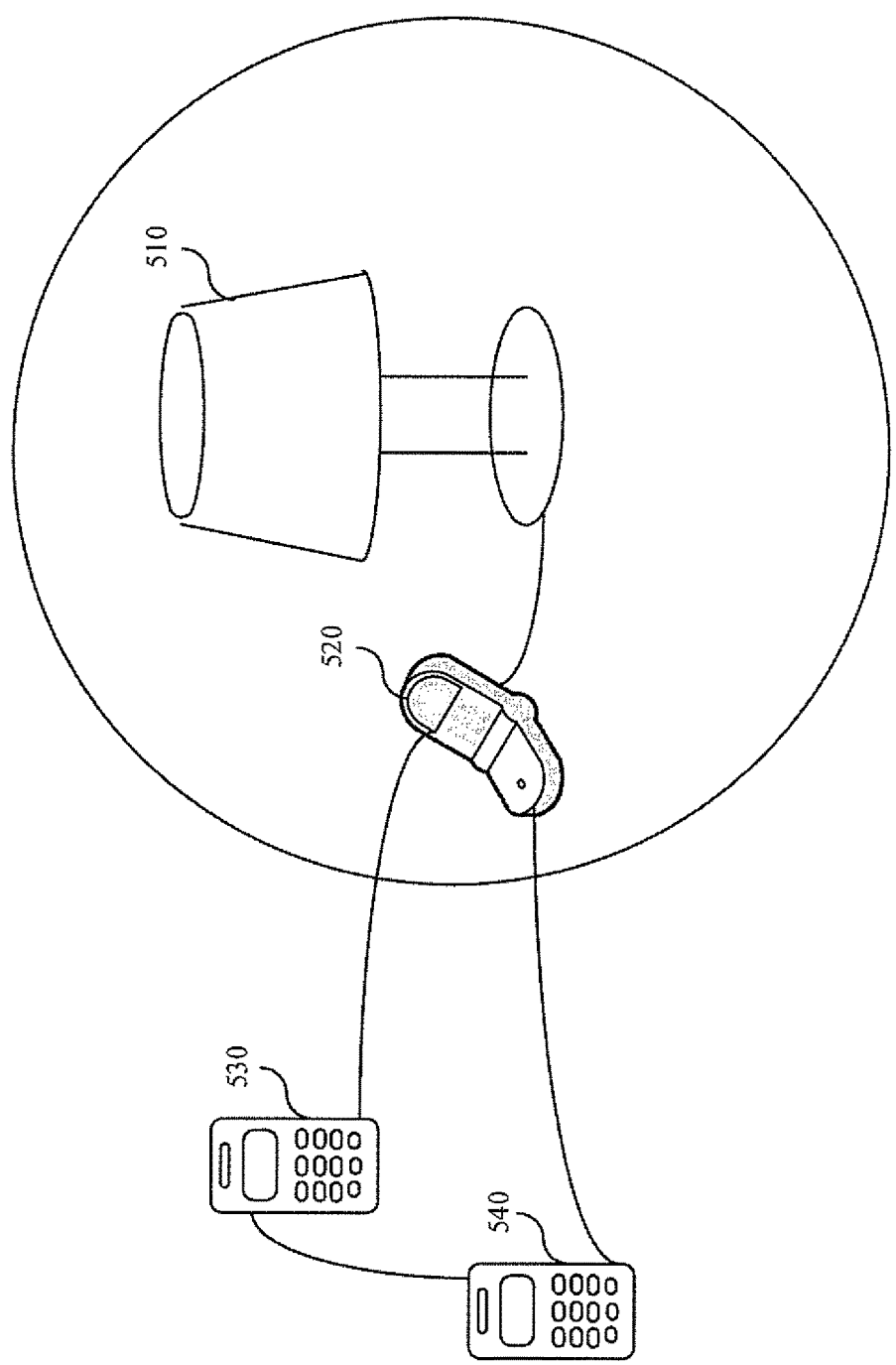
FIG. 5C is a diagram of another implementation of an example method for Bluetooth device management according to an implementation of this disclosure.

In an illustrative example, as shown in FIG. 5C, a Bluetooth device 510 can be a table lamp, a first terminal device, terminal device 520, can be a type of terminal device, second terminal devices, terminal devices 530 and 540, can be another type of terminal devices.

In some implementations, after establishing a connection between the first terminal device, the terminal device 520, and the Bluetooth device 510, the terminal device 520 can send a broadcast message including identifying data (e.g., an identifier) of the Bluetooth device 510; the second terminal devices, the terminal devices 530 and 540, can respectively receive the broadcast message sent by the terminal device 520 and send a connection request to the terminal device 520. The terminal device 520, the first terminal device, can then receive the connection requests sent by the terminal devices 530 and 540, from which identifiers of the terminal devices 530 and 540 can be acquired.

For example, the terminal device 520 can determine that the terminal device 530, a second terminal device, is in a first list of authorized terminal devices and send connection confirmation data to the terminal device 530. The terminal device 530 can receive the connection confirmation data sent by the terminal device 520 and establish a connection to the terminal device 520. At this moment, an identifier of the terminal device 520 can be included in a second list of authorized terminal devices in the terminal device 530. The terminal device 530, one of the second terminal devices, can then send control data to the terminal device 520, the first terminal device, for controlling the Bluetooth device 510, such as to turn it on. After receiving the control data, the terminal device 520 can send a Bluetooth control message to the Bluetooth device 510, and the Bluetooth device 510 can be switched on.

In another example, the terminal device 520 can determine that the terminal device 540, another second terminal device, is not in the first list of authorized terminal devices and send an authentication request to the terminal device 540. The terminal device 540 can receive the authentication request, in accordance to which authentication data can be sent to the terminal device 520. After receiving the authentication data sent by the terminal device 540, the terminal device 520 can determine that the authentication data is consistent with preset data, followed by sending connection confirmation data to the terminal device 540 and adding the identifier of the terminal device 540 into the first list of authorized terminal devices. The terminal device 540 can receive the connection confirmation data sent by the terminal device 520 and establish a connection to the terminal device 520. During the same time, the terminal device 540 can also establish a connection to the terminal device 530 for interaction between each other. At this moment, the identifiers of the terminal devices 530 and 540 can be included in the first list of authorized terminal devices in the terminal device 520; the identifiers of the terminal device 520 and the identifier of the terminal device 530 can be included in a third list of authorized terminal devices in the terminal device 540; and the identifiers of the terminal device 520 and the identifier of the terminal device 540 can be included the second list of authorized terminal devices in the terminal device 530. The terminal device 540 can then send control data to the terminal device 520 for controlling the Bluetooth device 510 to be turned off. After receiving the control data, the terminal device 520 can send a Bluetooth control message to the Bluetooth device 510, and the Bluetooth device 510 can be switched off.

In another illustrative example based on FIG. 5C, a LAN can be established between the first terminal device, the terminal device 520, and the second terminal devices, the terminal devices 530 and 540. After a period of time, the terminal device 520, the first terminal device, can move and lose the Bluetooth connection to the Bluetooth device 510, as well as the connections to the terminal devices 530 and 540. The terminal devices 530 and 540 can then enter (or remain within) a signal range of the Bluetooth device 510 to search for the Bluetooth device 510. After the Bluetooth device 510 is found, for example, the terminal device 530, previously one of the second terminal devices, can take precedence to establish a Bluetooth connection to the Bluetooth device 510. At this point, the terminal device 530 can become the new first terminal device and inform the terminal device 540 (still a second terminal device) that the current first terminal device is the terminal device 530.

The terminal device 530, now the first terminal device, can send a broadcast message associated with the Bluetooth device 510, and a terminal device 550 (not shown), a newly appearing second terminal device, can receive the broadcast message and send a connection request to the terminal device 530. The terminal device 530 can determine that the terminal device 550 is not in the second list of authorized terminal devices and send an authentication request to the terminal device 550, according to which the terminal device 550 can send authentication data to the terminal device 530. After determining the authentication data being consistent with the preset data, the terminal device 530 can establish a connection to the terminal device 550, via which the terminal 550 can send control data to the terminal device 530 for controlling the Bluetooth device 510. At this moment, the identifier of the terminal device 530 and the identifier of the terminal device 540 can be included in a fourth list of authorized terminal devices in the terminal device 550, and the identifier of the second terminal device 550 can also be respectively included in the second list of authorized terminal devices in the terminal device 530 and the third list of authorized terminal devices in the terminal device 540.

After a period of time, for example, the previous first terminal device, the terminal device 520, now a second terminal device, can move and receive the broadcast message sent by the terminal device 530, now the first terminal device. The terminal device 520 can then send a connection request to the terminal device 530. The terminal device 530 can determine that the identifier of the terminal device 520 is in the second list of authorized terminal devices and send connection confirmation data to the terminal device 520. The terminal device 520 can then establish a connection to the terminal device 530, and, accordingly, establish a connection to the terminal device 550 for interaction. At this moment, the terminal device 520 can control the Bluetooth device 510 via the terminal device 530. Meanwhile, the terminal device 520 can add the identifier of the terminal device 550 into the first list of authorized terminal devices and the terminal device 550 can add the identifier of the terminal device 520 into the fourth list of authorized terminal devices. As a result, the terminal device 530, the first terminal device, and the terminal devices 520, 540, and 550, the second terminal devices, are mutually authorized.

According to this disclosure, some implementations of apparatuses can be set forth in the following description for executing the implementations of methods disclosed herein. For details not disclosed in the apparatus implementations, the disclosed method implementations can be referred to.

Figure 6:
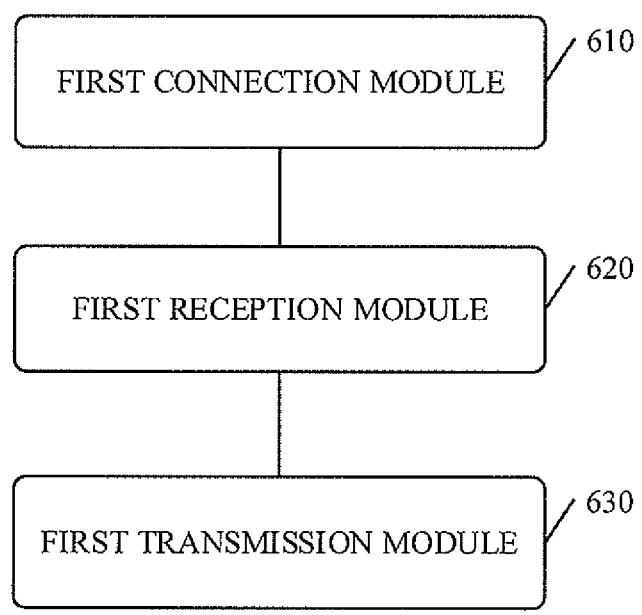
FIG. 6 is a box diagram of an example apparatus for Bluetooth device management according to an implementation of this disclosure.

FIG. 6 illustrates a box diagram of an example apparatus for Bluetooth device management according to implementations of this disclosure. The apparatus (e.g., Bluetooth device management apparatus) can be implemented as all or part of the terminal devices for Bluetooth device management set forth in the aforementioned description, via software, hardware, or a combination thereof. The apparatus can include the following modules.

A first connection module 610 can be configured to establish a Bluetooth connection to a Bluetooth device.

A first reception module 620 can be configured to receive control data sent by at least a second terminal device connected to the apparatus, in which the control data can be used to control the Bluetooth device.

A first transmission module 630 can be configured to send a Bluetooth control message associated with the control data to the Bluetooth device.

As discussed above, in the apparatus for Bluetooth device management set forth according to implementations of this disclosure, by establishing the Bluetooth connection between the apparatus and the Bluetooth device, the control data sent by the at least a second terminal device connected to the apparatus can be received, and the Bluetooth control message associated with the control data can be sent to the Bluetooth device. The apparatus can solved the problem that one Bluetooth device can be controlled by only one terminal device, and achieve a function of one-to-many connection between Bluetooth devices and terminal devices, enabling a Bluetooth device to be controlled by multiple terminal devices including the apparatus and the second terminal device, which can produce an effect of enlarging a controlling range for Bluetooth devices.

Figure 7:
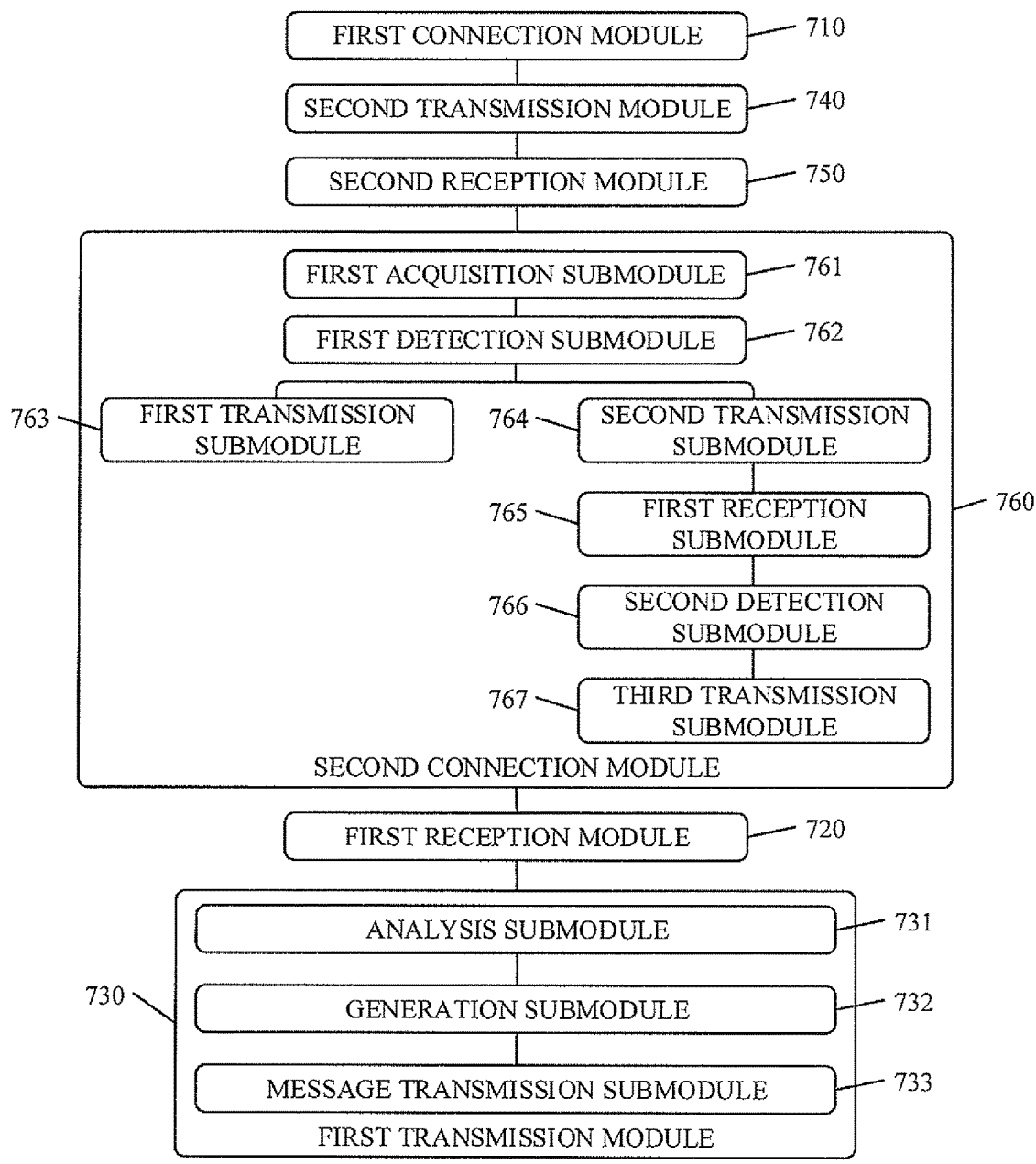
FIG. 7 is a box diagram of another example apparatus for Bluetooth device management according to an implementation of this disclosure.

FIG. 7 illustrates a box diagram of another example apparatus for Bluetooth device management according to implementations of this disclosure. The apparatus can be implemented as all or part of the terminal devices for Bluetooth device management set forth in the aforementioned description, via software, hardware, or a combination thereof. The apparatus can include the following modules.

A first connection module 710 can be configured to establish a Bluetooth connection to a Bluetooth device.

A first reception module 720 can be configured to receive control data sent by at least a second terminal device connected to the apparatus, in which the control data can be used to control the Bluetooth device.

A first transmission module 730 can be configured to send a Bluetooth control message associated with the control data to the Bluetooth device.

Optionally, in some implementations, the apparatus can further include the following modules.

A second transmission module 740 can be configured to send a broadcast message in a LAN, in which the broadcast message can include an identifier of the Bluetooth device;

A second reception module 750 can be configured to receive a connection request sent in accordance with the broadcast message by the at least a second terminal device.

A second connection module 760 can be configured to establish the connection to the at least a second terminal device in accordance with the connection request.

Optionally, in some implementations, the second connection module 760 can further include the following modules.

A first acquisition submodule 761 can be configured to receive an identifier of the at least a second terminal device from the connection request.

A first detection submodule 762 can be configured to determine whether the identifier of the at least a second terminal device is in a list of authorized terminal devices.

A first transmission submodule 763 can be configured to, if the identifier of the at least a second terminal device is determined as in the list of authorized terminal devices, send connection confirmation data to the at least a second terminal device, in which the at least a second terminal device can establish the connection to the apparatus based on the connection confirmation data.

Optionally, in some implementations, the second connection module 760 can further include the following modules.

A second transmission submodule 764 can be configured to, if the identifier of the at least a second terminal device is determined as not in the list of authorized terminal devices, send an authentication request to the at least a second terminal device.

A first reception submodule 765 can be configured to receive authentication data sent as feedback by the at least a second terminal device.

A second detection submodule 766 can be configured to determine whether the authentication data is consistent with preset data in the apparatus.

A third transmission submodule 767 can be configured to, if the authentication data is determined as consistent with the preset data in the apparatus, send connection confirmation data to the at least a second terminal device and adding the identifier of the at least a second terminal device into the list of authorized terminal devices, in which the at least a second terminal device can establish the connection to the apparatus based on the connection confirmation data.

Optionally, in some implementations, the first transmission module 730 can further include the following submodules.

An analysis submodule 731 can be configured to determine content data based on the control data.

A generation submodule 732 can be configured to generate the Bluetooth control message based on the content data.

A message transmission module 733 can be configured to send the Bluetooth control message to the Bluetooth device.

As discussed above, in the apparatus for Bluetooth device management set forth according to implementations of this disclosure, by establishing the Bluetooth connection between the apparatus and the Bluetooth device, the control data sent by the at least a second terminal device connected to the apparatus can be received, and the Bluetooth control message associated with the control data can be sent to the Bluetooth device. The apparatus can solved the problem that one Bluetooth device can be controlled by only one terminal device, and achieve a function of one-to-many connection between Bluetooth devices and terminal devices, enabling a Bluetooth device to be controlled by multiple terminal devices including the apparatus and the second terminal device, which can produce an effect of enlarging a controlling range for Bluetooth devices.

Further, in some implementations of this disclosure, by determining whether the identifier of the second terminal device is in the list of authorized terminal devices, establishing a connection to the second terminal device can be rendered optional to avoid unauthorized access from malicious terminals, which can improve security of the use of Bluetooth devices.

Figures 8, 9:
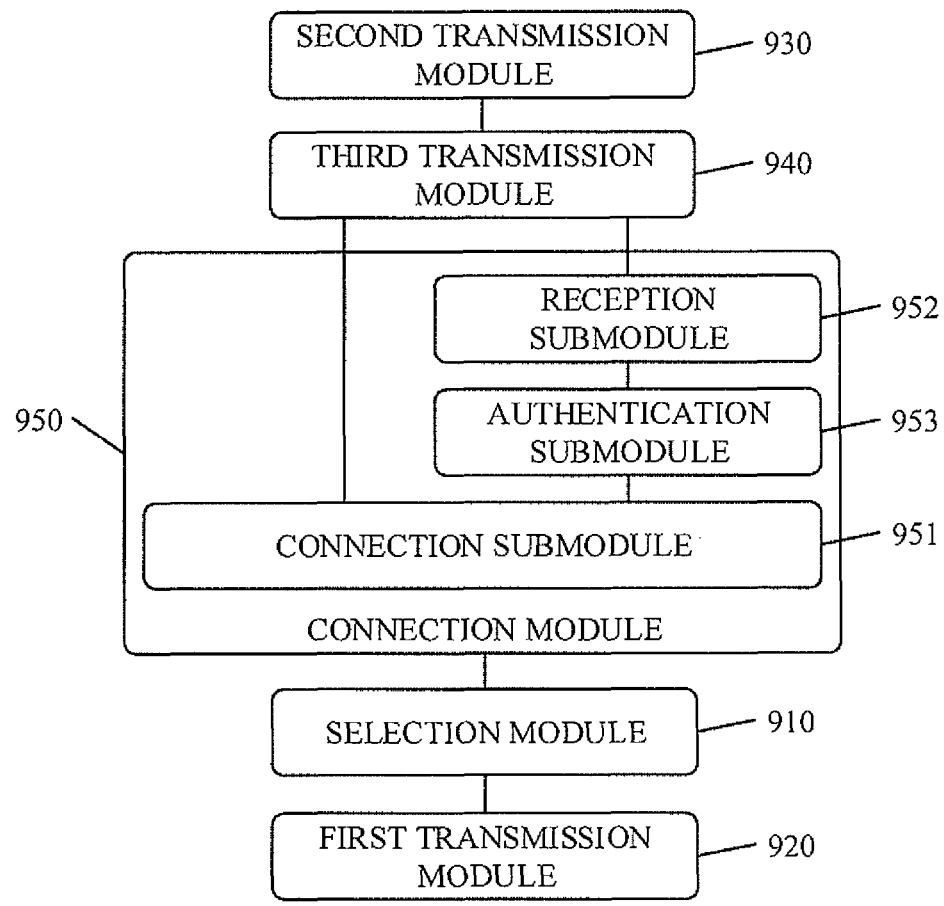
FIG. 8 is a box diagram of another example apparatus for Bluetooth device management according to an implementation of this disclosure.
FIG. 9 is a box diagram of another example apparatus for Bluetooth device management according to an implementation of this disclosure.

FIG. 8 illustrates a box diagram of another example apparatus for Bluetooth device management according to implementations of this disclosure. The apparatus can be implemented as all or part of the terminal devices for Bluetooth device management set forth in the aforementioned description, via software, hardware, or a combination thereof. The apparatus can include the following modules.

A selection module 810 can be configured to determine a first terminal device from terminal devices connected to the apparatus, in which the first terminal device can have established a Bluetooth connection to a Bluetooth device.

A first transmission module 820 can be configured to send control data to the first terminal device, in which the control data can be used to control the Bluetooth device and the first terminal device can send a Bluetooth control message associated with the control data to the Bluetooth device.

As discussed above, in the apparatus for Bluetooth device management set forth according to implementations of this disclosure, by determining the first terminal device by the apparatus from the devices connected to the apparatus, the control data can be sent to the first terminal device. The apparatus can solved the problem that one Bluetooth device can be controlled by only one terminal device, and achieve a function of one-to-many connection between Bluetooth devices and terminal devices, enabling a Bluetooth device to be controlled by multiple terminal devices including the first terminal device and the apparatus, which can produce an effect of enlarging a controlling range for Bluetooth devices.

FIG. 9 illustrates a box diagram of another example apparatus for Bluetooth device management according to implementations of this disclosure. The apparatus can be implemented as all or part of the terminal devices for Bluetooth device management set forth in the aforementioned description, via software, hardware, or a combination thereof. The apparatus can include the following modules.

A selection module 910 can be configured to determine a first terminal device from terminal devices connected to the apparatus, wherein the first terminal device can have established a Bluetooth connection to a Bluetooth device A first transmission module 920 can be configured to send control data to the first terminal device, in which the control data can be used to control the Bluetooth device and the first terminal device can send a Bluetooth control message associated with the control data to the Bluetooth device.

Optionally, in some implementations, the apparatus can further include the following modules.

A second transmission module 930 can be configured to receive a broadcast message sent by the first terminal device, in which the broadcast message can include an identifier of the Bluetooth device.

A third transmission module 940 can be configured to send a connection request to the first terminal device in accordance with the broadcast message, in which the connection request can include an identifier of the apparatus.

A connection module 950 can be configured to establish a connection to the first terminal device based on the connection request.

Optionally, in some implementations, the connection module 950 can further include the following submodules.

A connection submodule 951 can be configured to receive connection confirmation data and establish the connection to the first terminal device based on the connection confirmation data.

Optionally, in some implementations, the connection module 950 can further include the following submodules.

A reception submodule 952 can be configured to receive an authentication request sent by the first terminal device.

An authentication submodule 953 can be configured to send authentication data to the first terminal device in accordance with the authentication request.

As discussed above, in the apparatus for Bluetooth device management set forth according to implementations of this disclosure, by determining the first terminal device by the apparatus from the devices connected to the apparatus, the control data can be sent to the first terminal device. The apparatus can solved the problem that one Bluetooth device can be controlled by only one terminal device, and achieve a function of one-to-many connection between Bluetooth devices and terminal devices, enabling a Bluetooth device to be controlled by multiple terminal devices including the first terminal device and the apparatus, which can produce an effect of enlarging a controlling range for Bluetooth devices.

Further, in some implementations of this disclosure, by determining whether the identifier of the second terminal device is in the list of authorized terminal devices, establishing a connection to the second terminal device can be rendered optional to avoid unauthorized access from malicious terminals, which can improve security of the use of Bluetooth devices.

For apparatuses of examples set forth in the above description, the implementations of each module/submodule executing operations have been described in details in the implementations of related methods, thus further details will not be discussed hereinafter.

According to some implementations, an apparatus for Bluetooth device management is disclosed, which can implement the methods for Bluetooth device management disclosed herein. In some implementations, the apparatus for Bluetooth device management can include a processor or a processing unit, and a memory coupled to the processor and configured to store a set of instructions which can be executed by the processor.

The processor herein can be any type of device, or multiple devices, capable of manipulating or processing information. Although the examples herein can be practiced with a single processor as shown, advantages in speed and efficiency can be achieved using more than one processor. The processor herein can be distributed across multiple machines or devices (each machine or device having one or more processors) that can be coupled directly or across a local area or other network.

The memory herein can be any device, or multiple devices, capable of storing codes and data that can be accessed by the processor (e.g., via a bus). The codes can include an operating system (OS) and one or more application programs (e.g., apps) processing and/or outputting the data. The memory herein can be distributed across multiple machines or devices, such as a network-based memory or cloud-based memory.

In some implementations, the processor can be configured to execute instructions stored in the memory to: establish a Bluetooth connection to a Bluetooth device; receive control data sent by at least a second terminal device connected to the apparatus, in which the control data can be used to control the Bluetooth device; and send a Bluetooth control message associated with the control data to the Bluetooth device.

According to some implementations, an apparatus for Bluetooth device management is disclosed, which can implement the methods for Bluetooth device management disclosed herein. In some implementations, the apparatus for Bluetooth device management can include a processor or processing unit, and a memory coupled to the processor and configured to store a set of instructions which can be executed by the processor.

In some implementations, the processor can be configured to execute instructions stored in the memory to: determine a first terminal device from terminal devices connected to the apparatus, in which the first terminal device has established a Bluetooth connection to a Bluetooth device; and send control data to the first terminal device, in which the control data can be used to control the Bluetooth device and the first terminal device can send a Bluetooth control message associated with the control data to the Bluetooth device.

Figure 10:
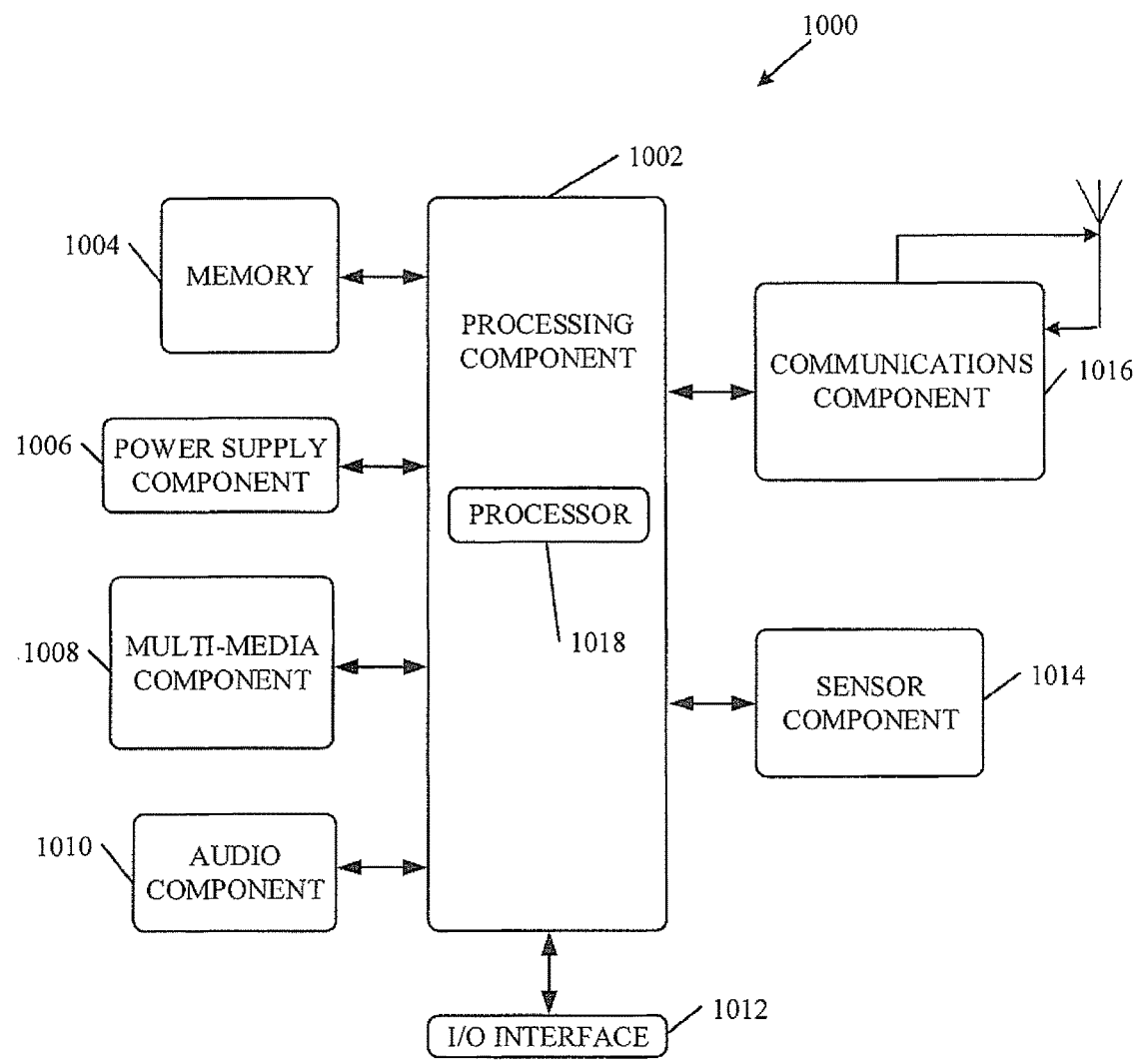
FIG. 10 is a box diagram of another example apparatus for Bluetooth device management according to another implementation of this disclosure.

FIG. 10 illustrates a box diagram of another example apparatus for Bluetooth device management according to implementations of this disclosure. In FIG. 10, for example, an apparatus 1000 can be a mobile phone, a computer, a digital broadcast terminal, a data/message transceiver, a game console, a tablet computing device, a medical device, a fitness device, a personal digital assistant (PDA) or any other computing device or system.

In FIG. 10, the apparatus 1000 can include one or more of the following components: a processing component 1002, a memory 1004, a power supply component 1006, a multi-media component 1008, an audio component 1010, an input/output (I/O) interface 1012, a sensor component 1014, and a communications component 1016.

The processing component 1002 generally control operations of the apparatus 1000 in entirety, such as, for example, information display, phone calls, data communications, camera operations, or operations associated with recording operations. The processing component 1002 can include one or more processors 1018 to execute instructions for implementing all or part of operations of the methods set forth in the above description. In addition, the processing component 1002 can include one or more modules for interactions between the processing component 1002 and other components. For example, the processing component 1002 can include a multi-media component for interactions between the multi-media component 1008 and the processing component 1002.

The memory 1004 can be configured to store various types of data to support operations in the apparatus 1000. For example, the data can include any application program or instructions of methods being operable in the apparatus 1000, such as contact data, phonebook data, messages, pictures, videos or other data. In some implementations, the memory 1004 can be any combination of any type of volatile or non-volatile storage device, such as a Static RAM (SRAM), an Electronically Erasable Programmable ROM (EEPRROM), an Erasable Programmable ROM (EPROM), a Programmable ROM (PROM), a ROM, a magnetic storage device, a flash storage device, or a magnetic/optical disc.

The power supply component 1006 can provide electrical power to the components of the apparatus 1000. In some implementations, the power supply component 1006 can include a power management system, one or more power sources, and other components associated with the apparatus 1000 for generating, managing, and distributing electrical power.

The multi-media component 1008 can include a display that provides an output interface between the apparatus 1000 and a user. In some implementations, the display can include a liquid crystal display (LCD) and/or a touch pad (TP). If the display includes a TP, the display can be implemented as a touch screen for receiving an input signal from the user. The TP can include one or more touch sensors for detecting touching, sliding, and gestures performed on the TP. Touch sensors can detect not only touching and/or boundaries of sliding gestures, but also time duration and pressure associated with the touching and/or sliding operations. In some implementations, the multi-media component 1008 can include a front-facing camera and/or a back-facing camera. When the apparatus 1000 is in an operation mode, such as, for example, a shooting mode or a video mode, the front-facing camera and/or the back-facing camera can receive external multi-media data. In some implementations, each of the front-facing camera and the back-facing camera can be a fixed optical lens system or have capability of focusing and optical zooming.

The audio component 1010 can be configured to input and/or output an audio signal. For example, the audio component 1010 can include a microphone (MIC). When the apparatus 1000 is in an operation mode, such as, for example, a calling mode, a recording mode, or a voice recognition mode, the MIC can be configured to receive external audio signals. The received audio signals can be further stored in the memory 1004 or sent via the communications component 1016. In some implementations, the audio component 1010 can include a speaker for outputting audio signals.

The I/O interface 1012 can provide an interface between the processing component 1003 and external interfacing modules, in which the external interfacing modules can be, for example, a keyboard, a trackball, or a button. The button can include but is not limited to a homepage button, a volume button, a start button and a lock button.

The sensor component 1014 can include one or more sensors for determining conditions of various aspects of the apparatus 1000. For example, the sensor component 1014 can detect an on/off status of the apparatus 1000 and/or relative positions of the components (e.g., a display and a keypad of the apparatus 1000). The sensor component 1014 can further detect a position change of the apparatus 1000 or a component thereof, whether a touch between a user and the apparatus 1000 existing or not, a change in direction or acceleration/deceleration of the apparatus 1000, or a temperature change of the apparatus 1000. The sensor component 1014 can include a proximity sensor, which can be configured to detect existence of proximate objects without any physical contact. The sensor component 1014 can also include an optical sensor, such as, for example, a Complementary Metal-Oxide Semiconductor (CMOS) imaging sensor or a Charge-Coupled Device (CCD) imaging sensor for use in imaging applications. In some implementations, the sensor component 1014 can also include an accelerometer, a gyroscope, a magnetic sensor, a pressure sensor, or a temperature sensor.

The communications component 1016 can be used for communications between the apparatus 1000 and other apparatuses in wired and/or wireless means. The apparatus 1000 can access a wireless network based on a communications standard, such as, for example, Wi-Fi, 2G, 3G, or any combination thereof. In some implementations, the communications component 1016 can receive a broadcast signal or broadcast-related information via a broadcast channel from an external broadcast management system. In some implementations, the communications component 1016 can also include a Near Field Communications (NFC) module to facilitate short-range communications. For example, the NFC module can be implemented based on a Radio-Frequency Identification (RFID) technology, an Infrared Data Association (IrDA) technology, an Ultra-Wideband (UWB) technology, a Bluetooth (BT) technology, or any other suitable technology.

In some implementations, the apparatus 1000 (and the algorithms, methods, instructions, etc., stored thereon and/or executed thereby) can be implemented via software, hardware, or a combination thereof. For example, the apparatus 1000 can be implemented as one or more of an Application-Specific Integrated Circuit (ASIC), a digital signal processor (DSP), a digital signal processing device (DSPD), a programmable logic device (PLD), a Field-Programmable Gate Array (FPGA), a controller, a microcontroller, a microprocessor, or any other electronic element for performing the aforementioned methods for Bluetooth device management. Further, portions of the computing devices do not necessarily have to be implemented in the same manner. Similarly, where the elements of the described aspects are implemented using software programming or software elements the disclosure can be implemented with any programming or scripting language such as C, C++, Java, assembler, or the like, with the various algorithms being implemented with any combination of data structures, objects, processes, routines or other programming elements. Functional aspects can be implemented in algorithms that execute on one or more processors. Furthermore, the aspects of the disclosure could employ any number of conventional techniques for electronics configuration, signal processing and/or control, data processing and the like. The terms "signal" and "data" are used interchangeably. The words "mechanism" and "element" are used broadly and are not limited to mechanical or physical implementations or aspects, but can include software routines in conjunction with processors, etc.

In some implementations, a non-transitory computer-readable medium including instructions is disclosed herein, such as, for example, the memory 1004 including instructions. The instructions can be executed by the processor 1018 of the apparatus 1000 to perform the aforementioned methods for Bluetooth device management. For example, the non-transitory computer-readable medium can be a ROM, a RAM, a CD-ROM, a magnetic tape, a floppy, an optical data storage device, or any other non-transitory/non-volatile storage device.

As described above, a person skilled in the art should be noted that, all or a portion of aspects of the disclosure described herein can be implemented using a general purpose computer/processor with a computer program. In addition, or alternatively, for example, a special purpose computer/processor can be utilized which can contain specialized hardware for carrying out any of the techniques, algorithms, or instructions described herein.

The aspects herein can be described in terms of functional block components and various processing operations. The disclosed processes and sequences may be performed alone or in any combination. Functional blocks can be realized by any number of hardware and/or software components that perform the specified functions. Any of the individual or combined functions described herein as being performed as examples of the disclosure can be implemented using machine readable instructions in the form of code for operation of any or any combination of the aforementioned computational hardware. Computational code can be implemented in the form of one or more modules by which individual or combined functions can be performed as a computational tool, the input and output data of each module being passed to/from one or more further module during operation of the methods and systems described herein.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

Any technician skilled in the art, after consideration of this specification and practicing this disclosure, can think of other implementations of this disclosure. This disclosure is intended to cover any modification, use, or adaptive variation herein, which follows a general principle of this disclosure and includes any prior knowledge or common technique in this technical field not disclosed herein. The specification and implementation examples are for illustrative purpose only, and the scope of this disclosure is indicated by the appended claims.

It is to be understood that this disclosure is not to be limited to the structures shown in the figures and set forth in the above description, and the structures can be modified and changed within the scope thereof. The scope of this disclosure shall be limited only by the appended claims.

What is claimed is:

1. A method for device management, comprising:
   sending, by a second terminal device, first control data to a first terminal device connected to a Bluetooth device, wherein the first terminal device sends a first Bluetooth control message associated with the first control data to the Bluetooth device, wherein the first control data allows the second terminal device to control the Bluetooth device;
   in response to the first terminal device becoming disconnected from the Bluetooth device, establishing, by the second terminal device, a Bluetooth connection with the Bluetooth device;
   in response to the second terminal device establishing the Bluetooth connection with the Bluetooth device, informing, by the second terminal device, a third terminal device that the second terminal device is directly connected to the Bluetooth device;
   receiving, by the second terminal device, second control data set by the third terminal device connected to the second terminal device, wherein the second control data allows the third terminal device to control the Bluetooth device; and
   sending, by the second terminal device, a second Bluetooth control message associated with the second control data to the Bluetooth device.

2. The method of claim 1, further comprising:
   sending, by the second terminal device, a broadcast message in a local area network, wherein the broadcast message comprises an identifier of the Bluetooth device;
   receiving, by the second terminal device, a connection request sent in accordance with the broadcast message by the third terminal device; and
   in accordance with the connection request, establishing, by the second terminal device, a connection to the third terminal device.

3. The method of claim 2, wherein the in accordance with the connection request, establishing, by the second terminal device, the connection to the third terminal device comprises:
   receiving, from the connection request, an identifier of the third terminal device;
   determining whether the identifier of the third terminal device is in a list of authorized terminal devices; and
   based on a determination that the identifier of the third terminal device is in the list of authorized terminal devices, sending connection confirmation data to the third terminal device, wherein the third terminal device establishes the connection to the second terminal device based on the connection confirmation data.

4. The method of claim 2, wherein the in accordance with the connection request, establishing, by the second terminal device, the connection to the third terminal device comprises:
   receiving, from the connection request, an identifier of the third terminal device;
   determining whether the identifier of the third terminal device is in a list of authorized terminal devices;
   based on a determination that the identifier of the third terminal device is not in the list of authorized terminal devices, sending an authentication request to the third terminal device;
   receiving authentication data sent as feedback by the third terminal device;
   determining whether the authentication data is consistent with preset data in the second terminal device; and
   based on a determination that the authentication data is consistent with the preset data in the second terminal device, sending connection confirmation data to the third terminal device and adding the identifier of the third terminal device into the list of authorized terminal devices, wherein the third terminal device establishes the connection to the second terminal device based on the connection confirmation data.

5. The method of claim 1, wherein the sending, by the second terminal device, a second Bluetooth control message associated with the second control data to the Bluetooth device comprises:
   determining content data based on the second control data;
   based on the content data, generating the second Bluetooth control message; and
   sending the second Bluetooth control message to the Bluetooth device.

6. A terminal device for device management, comprising:
   a processor; and
   a memory coupled to the processor, the memory configured to store a set of instructions which when executed by the processor become operational with the processor to:
      send first control data to a first terminal device connected to a Bluetooth device, wherein the first terminal device sends a first Bluetooth control message associated with the first control data to the Bluetooth device, wherein the first control data allows the terminal device to control the Bluetooth device;
      in response to the first terminal device becoming disconnected from the Bluetooth device, establish a Bluetooth connection with the Bluetooth device;

in response to establishing the Bluetooth connection with the Bluetooth device, inform a second terminal device that the terminal device is directly connected to the Bluetooth device;

receive second control data sent by the second terminal device connected to the terminal device, wherein the second control data allows the second terminal device to control the Bluetooth device; and send a second Bluetooth control message associated with the second control data to the Bluetooth device.

7. A system for device management, comprising:

a Bluetooth device; and a plurality of terminal devices capable of controlling the Bluetooth device within a controlling range, wherein the Bluetooth device is directly connected to a first terminal device of the plurality of terminal devices in a connectable range of the Bluetooth device using a Bluetooth connection, the first terminal device broadcasts an identifier of the Bluetooth device to at least one terminal device from the plurality of terminal devices, the controlling range is greater than the connectable range of the Bluetooth device, the plurality of terminal devices further comprises a second terminal device connected to the first terminal device and a third terminal device connected to at least one of the first terminal device or the second terminal device, at least one of the second terminal device or the third terminal device controls the Bluetooth device by sending control data to the first terminal device, and in response to the first terminal device becoming disconnected from the Bluetooth device via the Bluetooth connection, the second terminal device directly connects to the Bluetooth device using a second Bluetooth connection when in the connectable range of the Bluetooth device.

8. The system of claim 7, wherein the third terminal device controls the Bluetooth device by sending control data to the second terminal device.

9. The system of claim 7, wherein the second terminal device informs the third terminal device that the second terminal device is directly connected to the Bluetooth device using the second Bluetooth connection in response to the second terminal device directly connecting to the Bluetooth device using the second Bluetooth connection.

10. The system of claim 7, wherein the first terminal device controls the Bluetooth device by sending control data to the second terminal device.

11. The system of claim 7, wherein the first terminal device broadcasts the identifier of the Bluetooth device over a local area network.

12. The system of claim 11, wherein the first terminal device broadcasts an identifier of the first terminal device with the identifier of the Bluetooth device.

13. The system of claim 7, wherein the first terminal device broadcasts an identifier of the first terminal device with the identifier of the Bluetooth device.

14. The system of claim 7, wherein the second terminal device sends a connection request to the first terminal device in response to receiving the identifier of the Bluetooth device from the first terminal device.

15. The system of claim 14, wherein the connection request comprises an identifier of the second terminal device.

16. The system of claim 15, wherein the first terminal device and the second terminal device establish a connection in response to the connection request.

17. The system of claim 16, wherein the first terminal device receives the identifier of the second terminal device and determines whether the identifier of the second terminal device is in a list of authorized terminal devices.

* * * * *